(12) United States Patent
Ohata

(10) Patent No.: US 11,274,646 B2
(45) Date of Patent: Mar. 15, 2022

(54) CONTROL DEVICE FOR INTERNAL COMBUSTION ENGINE

(71) Applicant: HITACHI AUTOMOTIVE SYSTEMS, LTD., Hitachinaka (JP)

(72) Inventor: Eiichirou Ohata, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/972,104

(22) PCT Filed: Apr. 17, 2019

(86) PCT No.: PCT/JP2019/016415
§ 371 (c)(1),
(2) Date: Dec. 4, 2020

(87) PCT Pub. No.: WO2019/235078
PCT Pub. Date: Dec. 12, 2019

(65) Prior Publication Data
US 2021/0222664 A1 Jul. 22, 2021

(30) Foreign Application Priority Data
Jun. 8, 2018 (JP) .............................. JP2018-110400

(51) Int. Cl.
*F02P 15/10* (2006.01)
*F02P 9/00* (2006.01)
(Continued)

(52) U.S. Cl.
CPC ............... *F02P 15/10* (2013.01); *F02P 9/007* (2013.01); *F02D 2041/0015* (2013.01); *F02P 15/08* (2013.01); *F02P 2017/121* (2013.01)

(58) Field of Classification Search
CPC .. F02P 15/10; F02P 9/007; F02P 15/08; F02P 2017/12; F02P 2017/121;
(Continued)

(56) References Cited

U.S. PATENT DOCUMENTS 4,380,989 A * 4/1983 Takaki .................. F02P 3/0456
123/597
5,724,938 A * 3/1998 Yamada .................. F02P 15/08
123/169 CL
(Continued)

FOREIGN PATENT DOCUMENTS

| JP | 2000-199470 A | 7/2000 |
| JP | 2015-129464 A | 7/2015 |
| JP | 2017-172557 A | 9/2017 |

OTHER PUBLICATIONS

International Search Report with English translation and Written Opinion issued in corresponding application No. PCT/JP2019/016415 dated Jul. 23, 2019.

*Primary Examiner* — Logan M Kraft
*Assistant Examiner* — Joshua Campbell
(74) *Attorney, Agent, or Firm* — Foley & Lardner LLP

(57) ABSTRACT

Ignitability of a fuel by a spark plug is improved while an increase in the number of ignition coils is suppressed. A control device for an internal combustion engine includes an ignition control unit 83 which controls energization of an ignition coil 300a and an ignition coil 300b which each provide electric energy to a spark plug which discharges in a cylinder of an internal combustion engine to ignite a fuel, and a discharge amount detection unit which detects an inter-electrode voltage of the spark plug. After the ignition control unit 83 discharges the spark plug using the electric energy of the ignition coil 300a, the ignition control unit estimates a voltage which is supply-able from the ignition coil 300a to the spark plug, and controls energization of the
(Continued)

(a) RELATIONSHIP BETWEEN SUPPLY-ABLE VOLTAGE AND REQUIRED VOLTAGE (b) EXTENSION OF DISCHARGE PATH ignition coil so as to supply the electric energy of the second ignition coil 300b to the spark plug when a difference d between the estimated supply-able voltage and a required voltage based on the voltage detected by the discharge amount detection unit is equal to or less than a predetermined threshold value.

6 Claims, 9 Drawing Sheets

(51) Int. Cl.
  *F02P 15/08* (2006.01)
  *F02P 17/12* (2006.01)
  *F02D 41/00* (2006.01)

(58) Field of Classification Search
  CPC ....... F02D 2041/0015; F02D 2200/101; F02D 2200/0404; F02D 2200/0614; F02D 2200/0616
  See application file for complete search history.

(56) References Cited

U.S. PATENT DOCUMENTS

2014/0261319 A1* 9/2014 Kimura ................... F02D 37/02
                                                                    123/406.45
2018/0238293 A1* 8/2018 Sayama ................... F02D 35/02

* cited by examiner (a) RELATIONSHIP BETWEEN SUPPLY-ABLE VOLTAGE AND REQUIRED VOLTAGE (b) EXTENSION OF DISCHARGE PATH (a) RELATIONSHIP BETWEEN SUPPLY-ABLE VOLTAGE AND REQUIRED VOLTAGE (b) EXTENSION OF DISCHARGE PATH

US 11,274,646 B2

CONTROL DEVICE FOR INTERNAL COMBUSTION ENGINE

TECHNICAL FIELD

The present invention relates to a control device for an internal combustion engine.

BACKGROUND ART

In recent years, in order to improve fuel efficiency of a vehicle, a control device for an internal combustion engine has been developed which incorporates a technique of operating with an air-fuel mixture which is leaner than a theoretical air-fuel ratio or a technique of taking in a portion of an exhaust gas after combustion to suck the portion again.

In this type of control device of an internal combustion engine, an amount of a fuel or air in a combustion chamber deviates from a theoretical value, and thus, an ignition failure of the fuel by a spark plug is likely to occur.

PTL 1 discloses an ignition device of an internal combustion engine, which sets the number of ignitions in one cycle based on an operation state of an internal combustion engine, determines ignition in a cylinder of the internal combustion engine, and based on the number of ignitions when the ignition is determined, suppresses the number of the following ignitions.

CITATION LIST

Patent Literature

PTL 1: JP 2017-172557 A

SUMMARY OF INVENTION

Technical Problem

In the ignition device of an internal combustion engine disclosed in PTL 1, depending on the operation state of the internal combustion engine, a large number of ignitions may be set in order to avoid the ignition failure, and in this case, in order to supply sufficient electric energy to a spark plug, it is necessary to provide many ignition coils. However, increasing the number of ignition coils leads to an increase in size and cost of the ignition device, which is not preferable.

Therefore, the present invention is made in consideration of the above problems, and an object thereof is to improve ignitability of a fuel by a spark plug while suppressing an increase in the number of ignition coils.

Solution to Problem

According to an aspect of the present invention, there is provided a control device for an internal combustion engine, including: an ignition control unit which controls energization of a first ignition coil and a second ignition coil which each provide electric energy to a spark plug which discharges in a cylinder of an internal combustion engine to ignite a fuel; and a discharge amount detection unit which detects a voltage between electrodes of the spark plug, in which after the ignition control unit discharges the spark plug using the electric energy of the first ignition coil, the ignition control unit estimates a voltage which is supply-able from the first ignition coil to the spark plug, and controls energization of the second ignition coil so as to supply the electric energy of the second ignition coil to the spark plug when a difference between the estimated supply-able voltage and a required voltage for maintaining discharge of the spark plug based on the voltage detected by the discharge amount detection unit is equal to or less than a predetermined threshold value.

Advantageous Effects of Invention

According to the present invention, it is possible to improve the ignitability of a fuel by the spark plug while suppressing an increase in the number of ignition coils.

DESCRIPTION OF EMBODIMENTS

Hereinafter, a control device for an internal combustion engine according to an embodiment of the present invention will be described.

Hereinafter, a control device 1 which is one mode of the control device for an internal combustion engine according to the embodiment will be described.

In this embodiment, a case will be described as an example, in which the control device 1 controls the discharge (ignition) of a spark plug 200 provided in each cylinder 150 of a four-cylinder internal combustion engine 100.

Hereinafter, in the embodiment, a combination of some configurations or all configurations of the internal combustion engine 100 and some configurations or all configurations of the control device 1 is referred to as the control device 1 of the internal combustion engine 100.

Internal Combustion Engine

Figure 1:
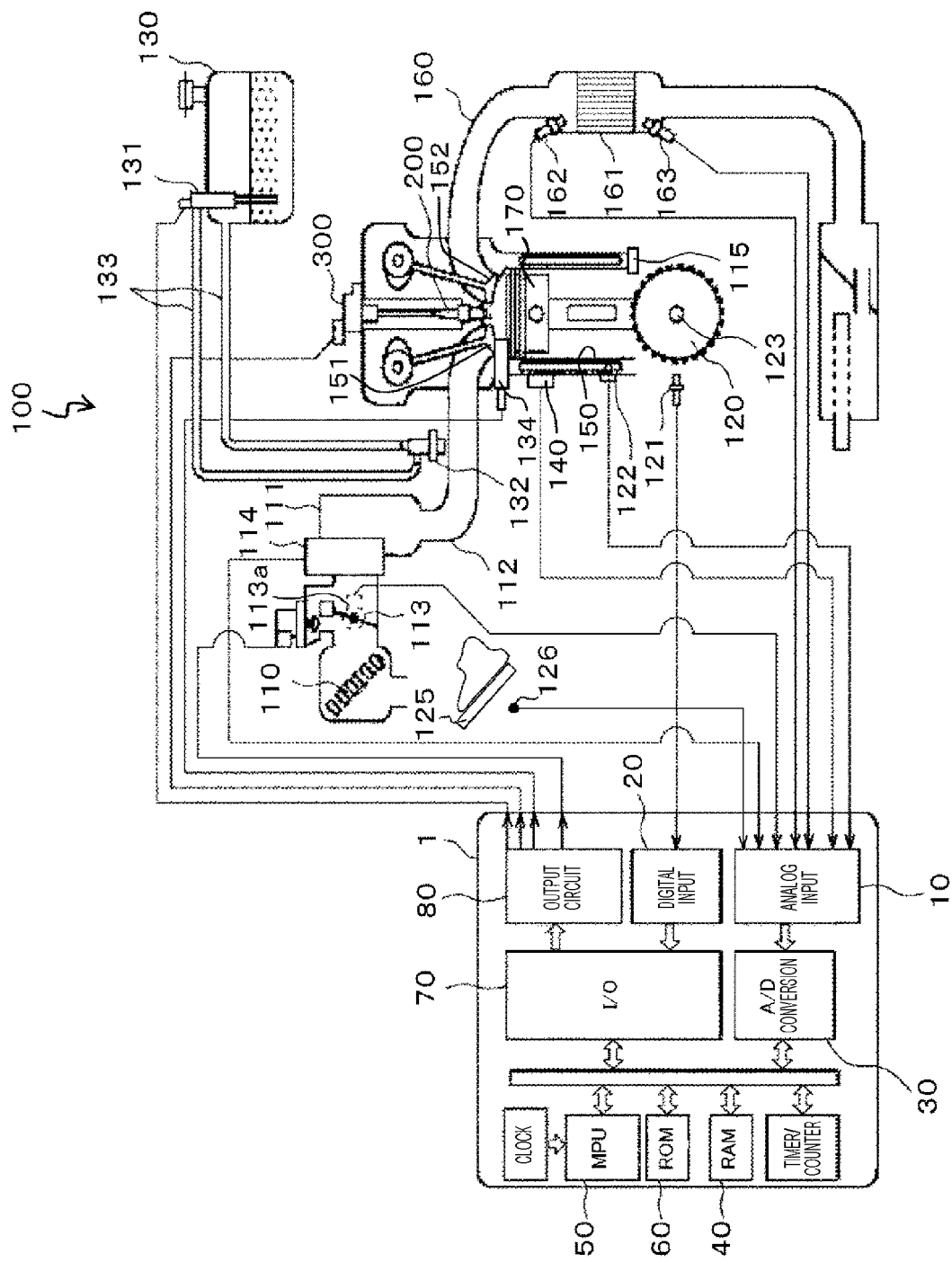
FIG. 1 is a diagram illustrating main configurations of an internal combustion engine and a control device for an internal combustion engine according to an embodiment.

FIG. 1 is a diagram illustrating main configurations of the internal combustion engine 100 and an ignition device for an internal combustion engine.

Figure 2:
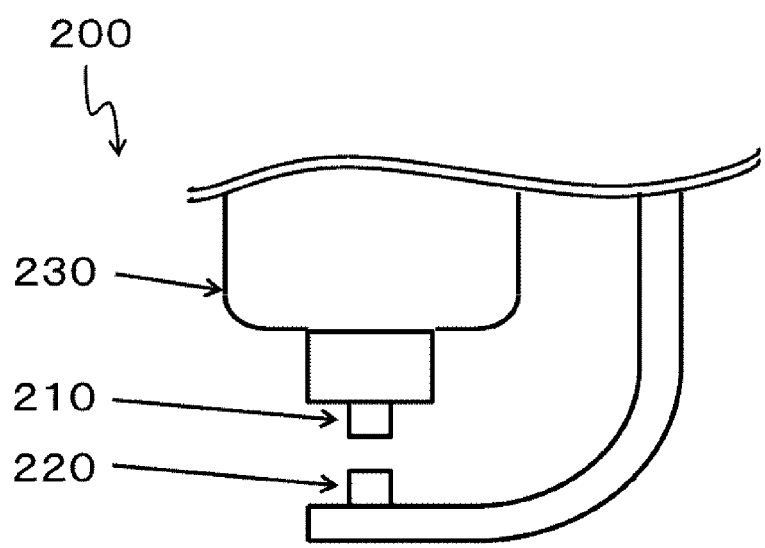
FIG. 2 is a partially enlarged view illustrating a spark plug.

FIG. 2 is a partially enlarged view illustrating electrodes 210 and 220 of the spark plug 200.

In the internal combustion engine 100, air sucked from the outside flows through an air cleaner 110, an intake pipe 111, and an intake manifold 112, and flows into each cylinder 150 when an intake valve 151 is opened. An amount of air flowing into each cylinder 150 is adjusted by a throttle valve 113, and the amount of air adjusted by the throttle valve 113 is measured by a flow rate sensor 114.

The throttle valve 113 is provided with a throttle opening sensor 113a which detects an opening of a throttle. Opening information of the throttle valve 113 detected by the throttle opening sensor 113a is output to the control device (Electronic Control Unit: ECU) 1.

As the throttle valve 113, an electronic throttle valve driven by an electric motor is used. However, any valve may be used as long as a flow rate of air can be appropriately adjusted.

A temperature of a gas flowing into each cylinder 150 is detected by an intake air temperature sensor 115.

A crank angle sensor 121 is provided radially outside a ring gear 120 attached to a crankshaft 123. The crank angle sensor 121 detects a rotation angle of the crankshaft 123. In the embodiment, for example, the crank angle sensor 121 detects the rotation angle of the crankshaft 123 every 10° and each combustion cycle.

A water temperature sensor 122 is provided in a water jacket (not illustrated) of the cylinder head. The water temperature sensor 122 detects a temperature of cooling water of the internal combustion engine 100.

Further, the vehicle includes an accelerator position sensor (APS) 126 that detects a displacement amount (depression amount) of an accelerator pedal 125. The accelerator position sensor 126 detects a torque required by a driver. The required torque of the driver detected by the accelerator position sensor 126 is output to the control device 1 described later. The control device 1 controls the throttle valve 113 based on this required torque.

A fuel stored in a fuel tank 130 is sucked and pressurized by a fuel pump 131, then flows through a fuel pipe 133 in which a pressure regulator 132 is provided, and is guided to a fuel injection valve (injector) 134. The fuel output from the fuel pump 131 is adjusted to a predetermined pressure by the pressure regulator 132, and is injected from the fuel injection valve (injector) 134 into each cylinder 150. As a result of the pressure adjustment by the pressure regulator 132, an excess fuel is returned to the fuel tank 130 via a return pipe (not illustrated).

The cylinder head (not illustrated) of the internal combustion engine 100 includes a cylinder pressure sensor (CPS) 140. The combustion pressure sensor 140 is provided in each cylinder 150 and detects a pressure (combustion pressure) in the cylinder 150.

As the combustion pressure sensor 140, a piezoelectric or gauge type pressure sensor is used, and can detect the combustion pressure (cylinder pressure) in the cylinder 150 over a wide temperature range.

An exhaust valve 152 and an exhaust manifold 160 which discharges the gas (exhaust gas) after combustion to an outside of the cylinder 150 are attached to each cylinder 150. A three-way catalyst 161 is provided on an exhaust side of the exhaust manifold 160.

When the exhaust valve 152 is opened, the exhaust gas is discharged from the cylinder 150 to the exhaust manifold 160. The exhaust gas passes through the exhaust manifold 160, is purified by the three-way catalyst 161, and is then discharged to the atmosphere.

An upstream-side air-fuel ratio sensor 162 is provided on an upstream side of the three-way catalyst 161. The upstream-side air-fuel ratio sensor 162 continuously detects an air-fuel ratio of the exhaust gas discharged from each cylinder 150.

Moreover, a downstream-side air-fuel ratio sensor 163 is provided on a downstream side of the three-way catalyst 161. The downstream-side air-fuel ratio sensor 163 outputs a switch-like detection signal in the vicinity of a theoretical air-fuel ratio. In the embodiment, for example, the downstream-side air-fuel ratio sensor 163 is an O2 sensor.

Further, the spark plug 200 is provided in an upper portion of each cylinder 150. Due to discharge (ignition) of the spark plug 200, a spark is ignited in a mixture of air and a fuel in the cylinder 150, an explosion occurs in the cylinder 150, and a piston 170 is pushed down. When the piston 170 is pushed down, the crankshaft 123 rotates.

An ignition coil 300 which generates electric energy (voltage) supplied to the spark plug 200 is connected to the spark plug 200. The discharge is generated between a center electrode 210 and an outer electrode 220 of the spark plug 200 (refer to FIG. 2) by the voltage generated in the ignition coil 300.

As illustrated in FIG. 2, in the spark plug 200, the center electrode 210 is supported by an insulator 230 in an insulated state. A predetermined voltage (in the embodiment, for example, 20,000 V to 40,000 V) is applied to this center electrode 210.

The outer electrode 220 is grounded. When the predetermined voltage is applied to the center electrode 210, the discharge (ignition) is generated between the center electrode 210 and the outer electrode 220.

In the spark plug 200, a dielectric breakdown of a gas component is generated due to a state of a gas existing between the center electrode 210 and the outer electrode 220 or the cylinder pressure, and the voltage at which the discharge (ignition) is generated is changed. The voltage at which this discharge is generated is referred to as a dielectric breakdown voltage.

A discharge control (ignition control) of the spark plug 200 is performed by an ignition control unit 83 of the control device 1 described later.

Returning to FIG. 1, an output signal from various sensors such as the throttle opening sensor 113a, the flow rate sensor 114, the crank angle sensor 121, the accelerator position sensor 126, the water temperature sensor 122, the combustion pressure sensor 140, or the like described above is output to the control device 1. The control device 1 detects an operation state of the internal combustion engine 100 based on the output signals from these various sensors, and controls an amount of air sent into the cylinder 150, a fuel injection amount, an ignition timing of the spark plug 200, or the like.

Hardware Configuration of Control Device

Next, the overall hardware configuration of the control device 1 will be described.

As illustrated in FIG. 1, the control device 1 includes an analog input unit 10, a digital input unit 20, an Analog/Digital (A/D) conversion unit 30, a Random Access Memory (RAM) 40, and a Micro-Processing Unit (MPU) 50, a Read Only Memory (ROM) 60, an Input/Output (I/O) port 70, and an output circuit 80.

Analog output signals from various sensors such as the throttle opening sensor 113a, the flow rate sensor 114, the accelerator position sensor 126, the upstream-side air-fuel ratio sensor 162, the downstream-side air-fuel ratio sensor 163, the combustion pressure sensor 140, and the water temperature sensor 122 are input to the analog input unit 10.

The A/D conversion unit 30 is connected to the analog input unit 10. The analog output signals from the various sensors input to the analog input unit 10 are subjected to signal processing such as noise removal, converted into digital signals by the A/D conversion unit 30, and stored in the RAM 40.

The digital output signal from the crank angle sensor 121 is input to the digital input unit 20.

An I/O port 70 is connected to the digital input unit 20, and the digital output signal input to the digital input unit 20 is stored in the RAM 40 via the I/O port 70.

Each output signal stored in the RAM 40 is arithmetically processed by the MPU 50.

The MPU 50 executes a control program (not illustrated) stored in the ROM 60 to arithmetically process the output signal stored in the RAM 40 according to a control program. The MPU 50 calculates a control value which defines an operation amount of each actuator (for example, the throttle valve 113, the pressure regulator 132, the spark plug 200, or the like) which drives the internal combustion engine 100 according to the control program, and temporarily stores the control value in the RAM 40.

The control value, which is stored in the RAM 40 and defines the operation amount of the actuator, is output to the output circuit 80 via the I/O port 70.

The output circuit 80 has a function of the ignition control unit 83 (refer to FIG. 3) which controls the voltage applied to the spark plug 200.

Functional Block of Control Device

Next, a functional configuration of the control device 1 will be described.

Figure 3:
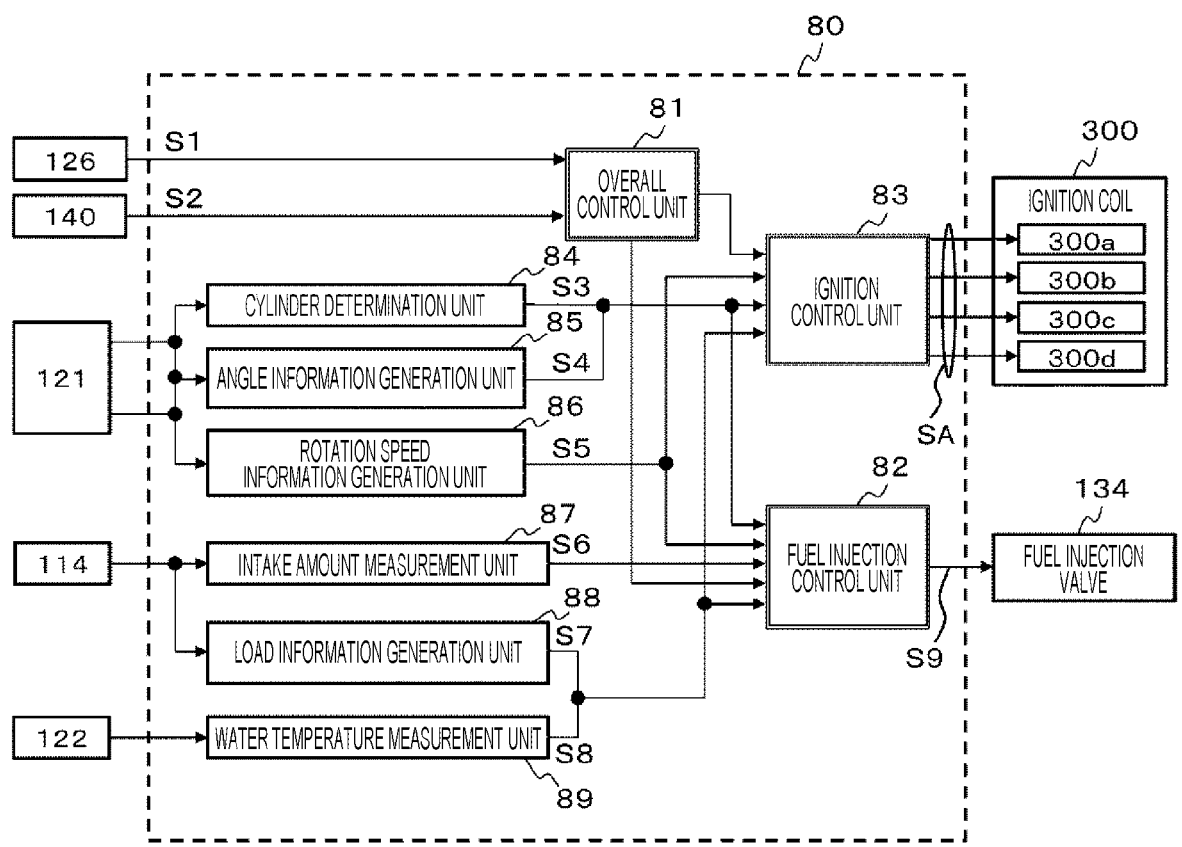
FIG. 3 is a functional block diagram illustrating a functional configuration of the control device.

FIG. 3 is a functional block diagram illustrating the functional configuration of the control device 1. For example, each function of the control device 1 is realized by the output circuit 80 when the MPU 50 executes the control program stored in the ROM 60.

As illustrated in FIG. 3, the output circuit 80 of the control device 1 includes an overall control unit 81, a fuel injection control unit 82, and the ignition control unit 83.

The overall control unit 81 is connected to the accelerator position sensor 126 and the combustion pressure sensor 140 (CPS), and receives a required torque (acceleration signal S1) from the accelerator position sensor 126 and an output signal S2 from the combustion pressure sensor 140.

The overall control unit 81 controls the fuel injection control unit 82 and the ignition control unit 83 as a whole based on the required torque (acceleration signal S1) from the accelerator position sensor 126 and the output signal S2 from the combustion pressure sensor 140.

The fuel injection control unit 82 is connected to a cylinder determination unit 84 which determines each cylinder 150 of the internal combustion engine 100, an angle information generation unit 85 which measures a crank angle of the crankshaft 123, and a rotation speed information generation unit 86 which measures an engine speed, and receives cylinder discrimination information S3 from the cylinder determination unit 84, crank angle information S4 from the angle information generation unit 85, and engine speed information S5 from the rotation speed information generation unit 86.

Further, the fuel injection control unit 82 is connected to an intake amount measurement unit 87 which measures an intake amount of the air sucked into the cylinder 150, a load information generation unit 88 which measures an engine load, and a water temperature measurement unit 89 which measures a temperature of engine cooling water, and receives intake air amount information S6 from the intake amount measurement unit 87, engine load information S7 from the load information generation unit 88, and cooling water temperature information S8 from the water temperature measurement unit 89.

The fuel injection control unit 82 calculates an injection amount of fuel to be injected from the fuel injection valve 134 and an injection time (fuel injection valve control information S9) based on the received information, and controls the fuel injection valve 134 based on the calculated fuel injection amount and injection time.

The ignition control unit 83 is connected to the cylinder determination unit 84, the angle information generation unit 85, the rotation speed information generation unit 86, the load information generation unit 88, and the water temperature measurement unit 89 in addition to the overall control unit 81, and receives each information from these.

The ignition control unit 83 calculates an amount of current (energization angle) for energizing a primary coil (not illustrated) of the ignition coil 300, an energization start time, and a time (ignition time) when the current for energizing the primary coil is cut off, based on the received information.

The ignition coil 300 includes a plurality of coils. The embodiment illustrates an example in which the ignition coil 300 includes four coils 300a to 300d. Hereinafter, the coils 300a to 300d forming the ignition coil 300 may be referred to as "ignition coils". However, the number of coils forming the ignition coil 300 is not limited to four, and any number of coils may be combined.

The ignition control unit 83 outputs the ignition signal SA to the primary coil 310 of each of the ignition coils 300a to 300d based on the calculated energization angle, the energization start time, and the ignition time, and performs a discharge control (ignition control) by the spark plug 200. This realizes multiple discharges of the spark plug 200.

At least a function of an ignition control unit 83 to control the ignition of the spark plug 200 using an ignition signal SA corresponds to the control device for an internal combustion engine of the present invention.

Electric Circuit of Ignition Coil

Next, an electric circuit 400a including the ignition coil 300a will be described as a representative of the four coils 300a to 300d constituting the ignition coil 300. The other ignition coils 300b to 300d also have the same electric circuit as the electric circuit 400a.

Figure 4:
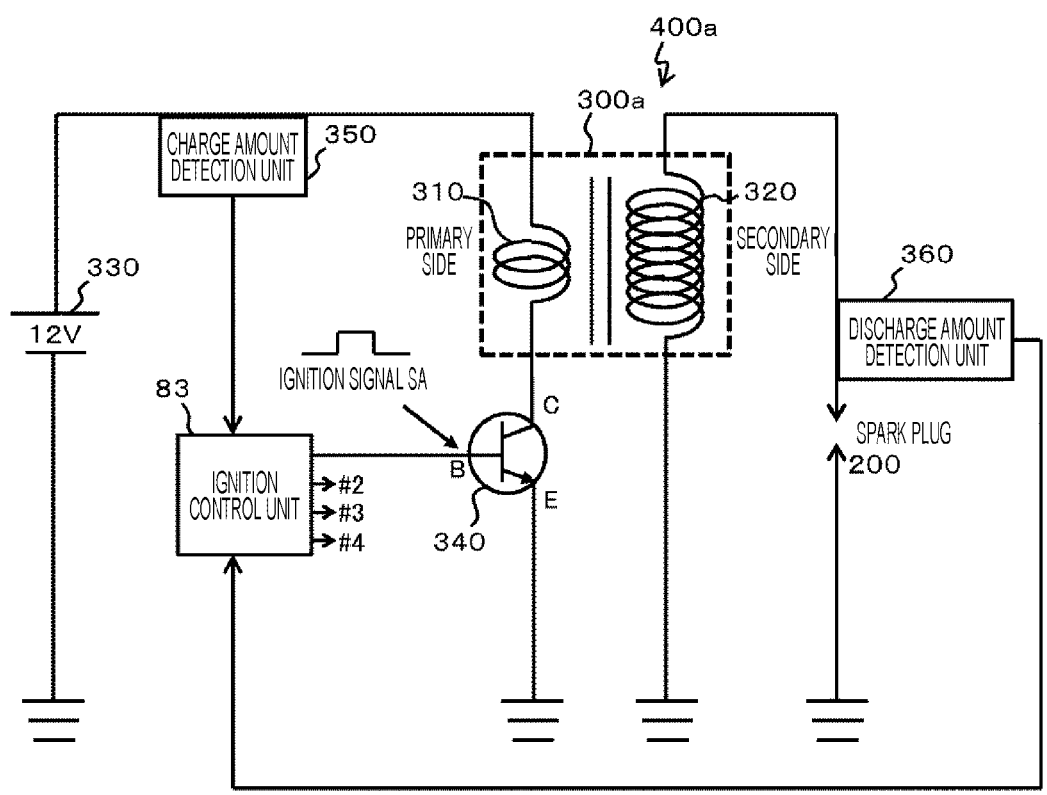
FIG. 4 is a diagram illustrating an electric circuit including an ignition coil.

FIG. 4 is a diagram illustrating the electric circuit 400a including the ignition coil 300a. In the electric circuit 400a, the ignition coil 300a is configured to include the primary coil 310 wound with a predetermined number of turns and a secondary coil 320 wound with the number of turns larger than that of the primary coil 310.

One end of the primary coil 310 is connected to a DC power supply 330. As a result, a predetermined voltage (for example, in the embodiment, 12 V) is applied to the primary coil 310. A charge amount detection unit 350 is provided in a connection path between the DC power supply 330 and the primary coil 310. The charge amount detection unit 350 detects the voltage and current applied to the primary coil 310 and transmits the detected voltage and current to the ignition control unit 83.

The other end of the primary coil 310 is connected to an igniter 340 and is grounded via the igniter 340. A transistor, a field effect transistor (FET), or the like is used for the igniter 340.

A base (B) terminal of the igniter 340 is connected to the ignition control unit 83. The ignition signal SA output from the ignition control unit 83 is input to the base (B) terminal of the igniter 340. When the ignition signal SA is input to the base (B) terminal of the igniter 340, a collector (C) terminal and an emitter (E) terminal of the igniter 340 are energized, and a current flows between the collector (C) terminal and the emitter (E) terminal. Accordingly, the ignition signal SA is output from the ignition control unit 83 to the primary coil 310 of the ignition coil 300a via the igniter 340, and electric power (electric energy) is accumulated in the primary coil 310.

When the output of the ignition signal SA from the ignition control unit 83 is stopped and the current flowing through the primary coil 310 is cut off, a high voltage corresponding to a winding number ratio of the coil with respect to the primary coil 310 is generated in the secondary coil 320. By applying the high voltage generated in the secondary coil 320 to the spark plug 200 (center electrode 210), a potential difference is generated between the center electrode 210 and the outer electrode 220 of the spark plug 200. When the potential difference generated between the center electrode 210 and the outer electrode 220 is equal to or more than a dielectric breakdown voltage Vm of the gas (mixture in the cylinder 150), a gas component is dielectrically broken, discharge is generated between the center electrode 210 and the outer electrode 220, and the fuel (air-fuel mixture) is ignited.

A discharge amount detection unit 360 is provided in a connection path between the secondary coil 320 and the spark plug 200. The discharge amount detection unit 360 detects the discharge voltage and current and sends them to the ignition control unit 83.

The ignition control unit 83 controls the energization of the ignition coil 300a by using the ignition signal SA by the operation of the electric circuit 400a as described above. With respect to the other ignition coils 300b to 300d, the energization is controlled using the ignition signal SA by the same operation of the electric circuit. As a result, the electric energy applied from the ignition coils 300a to 300d to the spark plug 200 is controlled, and the ignition control for multiple-discharging the spark plug 200 is performed.

In the electric circuit 400a illustrated in FIG. 4, one of the DC power supply 330, the charge amount detection unit 350, and the discharge amount detection unit 360 may be shared by the ignition coils 300a to 300d, or each coil may be provided individually.

Comparison with Conventional Method

Next, the discharge control of the spark plug 200 according to the embodiment will be described in comparison with the conventional method.

Figure 5:
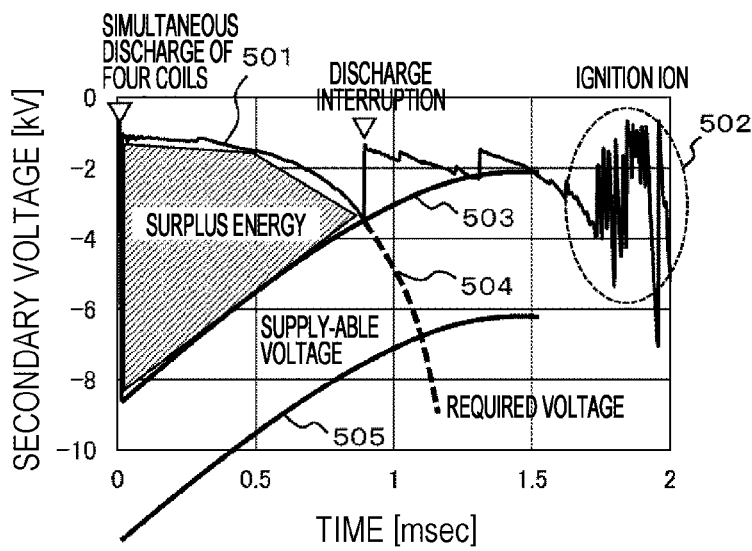
FIG. 5 is a schematic diagram illustrating an example of a conventional multiple discharge method.
Figure 5:
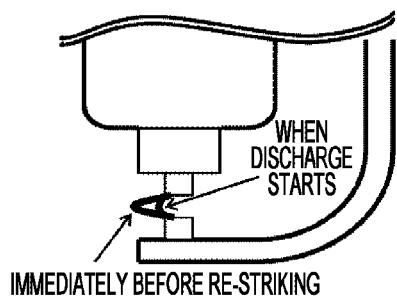

FIG. 5 is a schematic diagram illustrating an example of a conventional multiple discharge method. The target charge amounts of all the ignition coils 300a to 300d constituting the ignition coil 300 are determined by the engine speed (ignition cycle) or the charging voltage so that an energy consumption amount per unit time is about the same.

In the conventional multiple discharge method, the ignition control unit 83 refers to predetermined map information and simultaneously outputs the ignition signal SA having a pulse width matching the target charge amount to all the ignition coils 300a to 300d (igniter 340). Each of the ignition coils 300a to 300d accumulates electric energy while receiving the ignition signal SA, and simultaneously starts releasing the accumulated electric energy when the reception of the ignition signal SA ends. By releasing the electric energy from the ignition coils 300a to 300d, a high voltage is applied between the electrodes of the spark plug 200 connected to the ignition coils 300a to 300d, and discharging is generated.

In FIG. 5(a), a reference sign 501 indicates a time change of an inter-electrode voltage of the spark plug 200. A portion of a reference sign 502 in which the inter-electrode voltage 501 is largely changed indicates generation of ions (ignition ions) due to ignition of the fuel.

Further, a reference sign 503 indicates a time change of a voltage which can be supplied to the spark plug 200 by the ignition coil 300, and a reference sign 504 indicates a time change of a required voltage necessary to maintain discharge of the spark plug 200. In addition, a reference sign 505 indicates a time change of the supply-able voltage when eight coils are used as the ignition coil 300 for comparison with the supply-able voltage 503. However, as described above, the ignition coil 300 is actually configured of the four ignition coils 300a to 300d. Accordingly, the supply-able voltage 505 cannot be supplied to the spark plug 200.

As illustrated in FIG. 5(a), the required voltage 504 matches the inter-electrode voltage 501 in a period from the start of the discharge of the spark plug 200 to the interruption of the discharge. That is, during this period, the required voltage 504 can be detected by the discharge amount detection unit 360 of FIG. 4. Here, the inter-electrode voltage (secondary voltage output from the secondary coil 320) of the spark plug 200 is generally represented by a negative value. Therefore, in FIG. 5(a), magnitudes of the voltages 501 to 505 are represented by negative values.

In the following description, increasing (raising) or decreasing (lowering) each voltage in a negative direction is simply referred to as "increasing (raising)" or "decreasing (lowering)".

As illustrated in FIG. 5(a), when electric energy is simultaneously released from the ignition coils 300a to 300d, the supply-able voltage 503 is sharply raised and then gradually decreases with time. Meanwhile, the required voltage 504 (inter-electrode voltage 501) gradually increases with time. This is because a length of a discharge path between the electrodes of the spark plug 200 increases with time from the start of the discharge. In general, a gas flow occurs in a combustion chamber of an engine. Due to the gas flow, the discharge path is lengthened with time from the start of the discharge, and thus, the required voltage 504 is raised. As a result, when the supply-able voltage 503 is lower than the required voltage 504, the discharge path cannot be maintained and the discharge is interrupted. FIG. 5(b) illustrates an example of an extension of the discharge path from the start of the discharge to immediately before (immediately before re-striking) the interruption of the discharge. When the discharge is interrupted, the inter-electrode voltage 501 is sharply lowered and deviates from the required voltage 504, as illustrated in FIG. 5(a).

Here, in FIG. 5(a), a difference between the supply-able voltage 503 and the required voltage 504 is the largest at the start of the discharge and decreases with time. That is, when the difference between the supply-able voltage 503 and the required voltage 504 is large like immediately after the start of the discharge, an excessive voltage is applied from the ignition coil 300 to the spark plug 200 with respect to the voltage required to maintain the discharge path. Accordingly, an excessive current is flowing between the electrodes of the spark plug 200. Such excessive voltage and current are consumed as surplus energy which is unnecessary for maintaining the discharge path. As a result, for example, in the example of FIG. 5(*a*), the discharge is interrupted about 0.8 msec after the start of the discharge. The difference between the supply-able voltage 503 and the required voltage 504 (inter-electrode voltage 501) from the start of the discharge to the interruption of the discharge indicated by hatching in FIG. 5(*a*) represents the above surplus energy.

Figure 6:
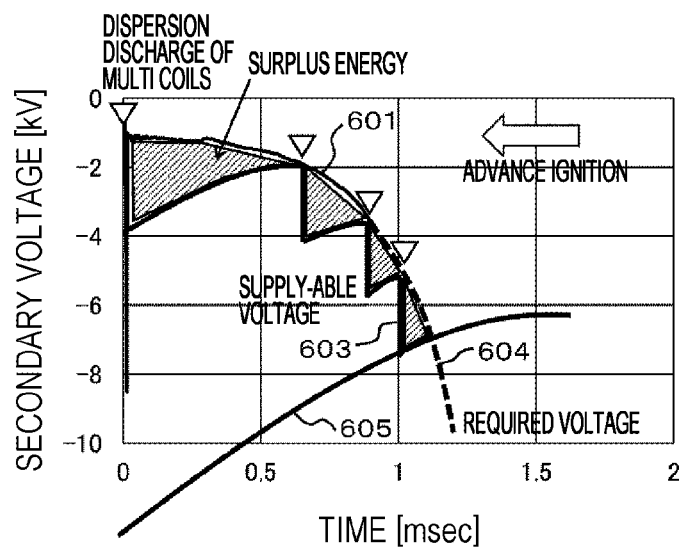
FIG. 6 is a schematic diagram illustrating an example of a multiple discharge method according to the embodiment.
Figure 6:
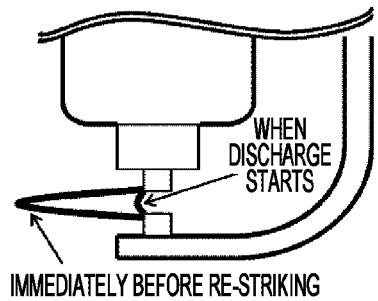

FIG. 6 is a schematic diagram illustrating an example of the multiple discharge method according to the embodiment of the present invention. Similar to the conventional method described in FIG. 5, the target charge amounts of all the ignition coils 300*a* to 300*d* constituting the ignition coil 300 are determined by the engine speed (ignition cycle) or the charging voltage so that an energy consumption amount per unit time is about the same.

In the multiple discharge method according to the embodiment, the ignition control unit 83 refers to predetermined map information and sequentially outputs the ignition signal SA to each ignition coil 300*a* to 300*d* (igniter 340) at a timing based on the target charge amount. At this time, the ignition control unit 83 outputs the ignition signal SA having a pulse width matching the target charge amount with respect to the first ignition coil 300*a*, as in the conventional method. Meanwhile, for each of the second and subsequent ignition coils 300*b* to 300*d*, electric energy is supplied from the ignition coils 300*b* to 300*d* to the spark plug 200 immediately before the supply-able voltage of the ignition coil 300 is lower than the required voltage, and the pulse width of the ignition signal SA is controlled and output so that the spark plug 200 is continuously discharged. Each of the ignition coils 300*a* to 300*d* accumulates the electric energy while receiving the ignition signal SA, and sequentially starts releasing the accumulated electric energy when the reception of the ignition signal SA ends. By releasing the electric energy from the ignition coils 300*a* to 300*d*, a high voltage is applied between the electrodes of the spark plug 200 connected to the ignition coils 300*a* to 300*d*, and discharging is generated.

In FIG. 6(*a*), reference sign 601 indicates a time change of the inter-electrode voltage of the spark plug 200. A reference sign 603 indicates a time change of the voltage which can be supplied to the spark plug 200 by the ignition coil 300, and a reference sign 604 indicates a time change of the required voltage necessary to maintain the discharge of the spark plug 200.

Moreover, a reference sign 605 indicates a time change of the supply-able voltage when eight coils are used as the ignition coil 300 for comparison with the supply-able voltage 603. However, as in the case of FIG. 5(*a*), the ignition coil 300 is actually configured of the four ignition coils 300*a* to 300*d*. Accordingly, the supply-able voltage 605 cannot be supplied to the spark plug 200. Further, in FIG. 6(*a*), as in FIG. 5(*a*), the magnitude of each of the voltages 601 to 605 is represented by a negative value.

As illustrated in FIG. 6(*a*), when electric energy is sequentially released from the ignition coils 300*a* to 300*d*, the supply-able voltage 603 increases each time and gradually decreases with time. Meanwhile, similarly to FIG. 5(*a*), the required voltage 604 (inter-electrode voltage 601) gradually increases with time. As a result, when the supply-able voltage 603 is lower than the required voltage 604 after the fourth releasing of the electric energy, the discharge path cannot be maintained and the discharge is interrupted. FIG. 6(*b*) illustrates an example of the extension of the discharge path from the start of the discharge to immediately before (immediately before re-striking) the interruption of the discharge. As in FIG. 5(*a*), in FIG. 6(*a*), when the discharge is interrupted, the inter-electrode voltage 601 is sharply lowered and deviates from the required voltage 604.

A difference between the supply-able voltage 603 and the required voltage 604 (inter-electrode voltage 601) from the start of the discharge to the interruption of the discharge, which is indicated by hatching in FIG. 6(*a*), represents surplus energy for maintaining the discharge path. This surplus energy is smaller than the surplus energy in the conventional method illustrated in FIG. 5(*a*). That is, in the multiple discharge method according to the embodiment, by dispersing and releasing the electric energy from the ignition coils 300*a* to 300*d*, the surplus energy with respect to the maintenance of the discharge path can be reduced as compared with the conventional multiple discharge method described in FIG. 5(*a*). As a result, for example, in the example of FIG. 6(*a*), the discharge is interrupted about 1.2 msec after the start of the discharge, and the time until the discharge is interrupted can be extended as compared with the conventional method. Further, as illustrated in FIG. 6(*b*), the discharge path immediately before the interruption of the discharge can be extended as compared with the conventional method. Therefore, it is understood that the multiple discharge method according to the embodiment can improve ignitability as compared with the conventional method.

Control Method of Spark Plug

Figure 7:
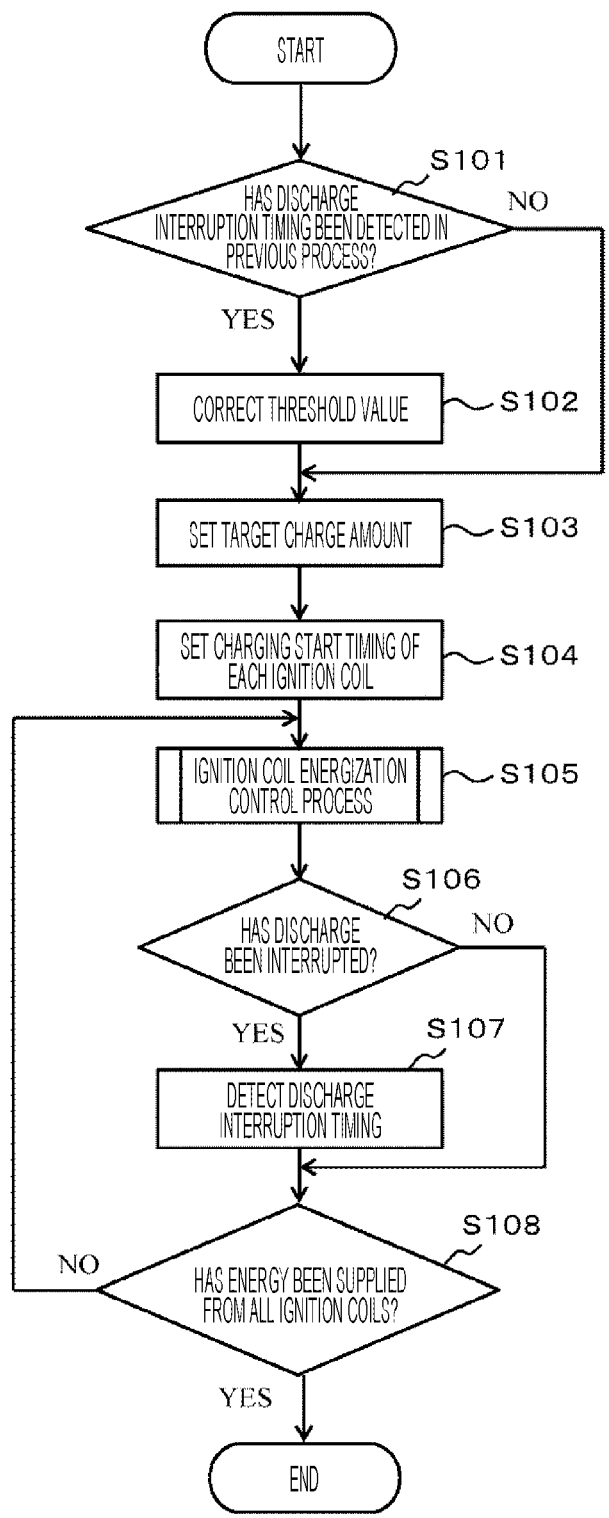
FIG. 7 is an example of a flowchart illustrating a method for controlling the spark plug by an ignition control unit according to the embodiment.

Next, an example of a control method of the spark plug 200 by the ignition control unit 83 will be described. FIG. 7 is an example of a flowchart illustrating a method for controlling the spark plug 200 by the ignition control unit 83 according to the embodiment.

As illustrated in FIG. 7, in Step S101, the ignition control unit 83 determines whether or not a discharge interruption time is detected in the previous process. When the discharge interruption time is detected by executing Step S107 described below during the previous process (Step S101: YES), the process proceeds to Step S102, and when the discharge interruption time is not detected in the previous process (Step S101: NO), the process proceeds to Step S103.

In Step S102, the ignition control unit 83 corrects a threshold value for controlling the energization of the respective ignition coils, from which the electric energy is released second and subsequent times, among the ignition coils 300*a* to 300*d*, that is, the ignition coils 300*b* to 300*d*. This threshold value is used in a determination process of Step S308 of FIG. 9 described later, and a timing of supplying electric energy from the ignition coils 300*b* to 300*d* to the spark plug 200 is controlled by the threshold value.

In Step S103, the ignition control unit 83 sets the target charge amount of each of ignition coils 300*a* to 300*d*, based on the engine speed represented by the engine speed information S5 from the rotation speed information generation unit 86 or the charging voltage of each of the ignition coils 300*a* to 300*d* detected by the charge amount detection unit 350. For example, it is possible to set the target charge amount according to the engine speed or the charging voltage by referring to the map information stored in the ROM 60 in the control device 1. In the energization control process executed in Step S105 described below, an energization time of the primary coil 310 in each of the ignition coils 300*a* to 300*d* is adjusted based on the target charge amount set here.

In Step S104, the ignition control unit 83 sets a charging start timing of each of the ignition coils 300a to 300d based on the target charge amount set in Step S103. For example, a discharge interval of each of the ignition coil 300a to 300d in the previous process is stored, and the charging start timing is set so that the time difference until the target charge amount is charged in each of the ignition coils 300a to 300d is equal to the discharge interval. Alternatively, the charging start timings of all the ignition coils 300a to 300d may be the same as each other. Moreover, it is possible to set the charging start timing of each of the ignition coil 300a to 300d by any method.

In Step S105, the ignition control unit 83 performs the energization control process of each of the ignition coils 300a to 300d. Here, the energization control process of each of the ignition coils 300a to 300d is performed by controlling the ignition signal SA output to each of the ignition coil 300a to 300d. The details of the energization control process performed in Step S105 will be described later with reference to FIGS. 8 and 9.

In Step S106, the ignition control unit 83 determines whether or not the discharge of the spark plug 200 is interrupted, based on the voltage (inter-electrode voltage) or current of the spark plug 200 detected by the discharge amount detection unit 360. If the discharge interruption is detected (Step S106: YES), the process proceeds to Step S107, and if the discharge interruption is not detected (Step S106: NO), the process proceeds to Step S108.

In Step S107, the ignition control unit 83 detects a discharge interruption time indicating a timing at which the discharge interruption occurs in the spark plug 200. For example, an elapsed time from the start of the discharge until it is determined that the discharge is interrupted in Step S106 is detected as the discharge interruption time. When the discharge interruption time is detected in Step S107, the information is stored in the RAM 40 and the process proceeds to Step S108.

In Step S108, the ignition control unit 83 determines whether or not electric energy has supplied from all the ignition coils 300a to 300d to the spark plug 200. In the energization control process of Step S105, the energization of all the ignition coils 300a to 300d has been completed, and when the electric energy cannot be supplied from the ignition coil 300 any more (Step S108: YES), the process flow of FIG. 7 ends. Meanwhile, if there is at least one ignition coil, to which the electric energy is not supplied, among the ignition coils 300a to 300d (Step S108: NO), the process returns to Step S105 to continue the energization control process.

Figure 8:
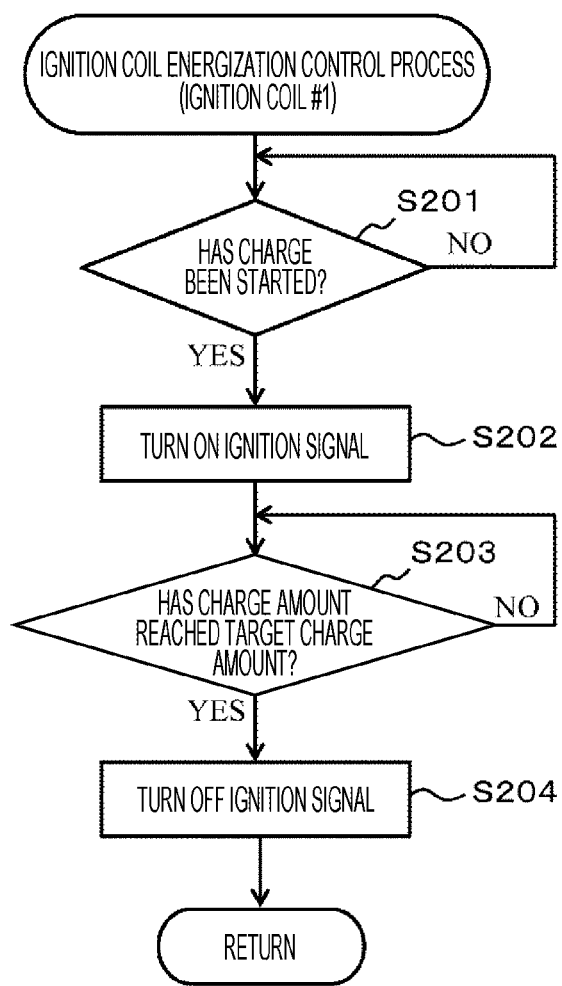
FIG. 8 is an example of a flowchart illustrating an energization control process executed for an ignition coil from which electric energy is released first time.
Figure 9:
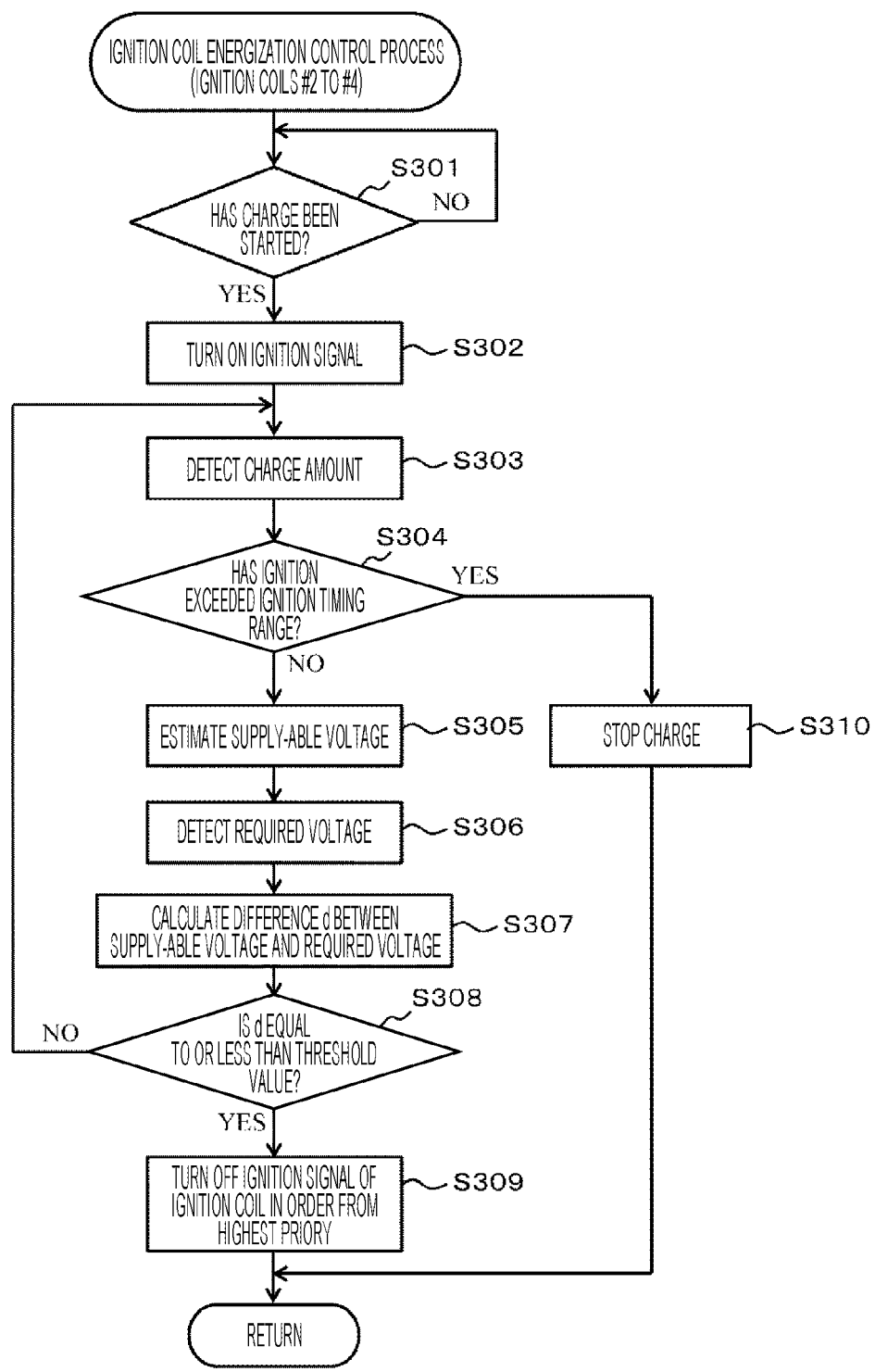
FIG. 9 is an example of a flowchart illustrating the energization control process executed for ignition coils from which the electric energy is released second and subsequent times.

Next, details of the energization control process executed in Step S105 will be described. FIG. 8 is an example of a flowchart for explaining the energization control process executed for the ignition coil, from which the electric energy is released first time, among the ignition coils 300a to 300d, that is, the ignition coil 300a. FIG. 9 is an example of a flowchart illustrating an energization control process executed for each of the ignition coils, from which the electric energy is released second and subsequent times, among the ignition coils 300a to 300d, that is, each of the ignition coils 300b to 300d.

First, the flowchart of FIG. 8 will be described. As illustrated in FIG. 8, in Step S201, the ignition control unit 83 determines whether to start charging the ignition coil 300a based on the charging start timing set in Step S104 of FIG. 7. Step S201 is repeated until it is determined to start the charging (Step S201: NO), and when it is determined to start charging (Step S201: YES), the process proceeds to Step S202.

In Step S202, the ignition control unit 83 turns on the pulse of the ignition signal SA to start charging the ignition coil 300a. According to the output of the ignition signal SA, the electric energy is accumulated in the primary coil 310 of the ignition coil 300a.

In Step S203, the ignition control unit 83 determines whether or not the charge amount of the ignition coil 300a reaches the target charge amount set in Step S103. For example, a current charge amount of the ignition coil 300a is estimated based on a detection result of the charge amount detection unit 350, and the determination in Step S203 can be performed depending on whether or not the estimated value reaches the target charge amount. Alternatively, the pulse width of the ignition signal SA is set based on the target charge amount set in Step S103, and the determination in Step S203 is performed depending on whether or not an elapsed time after starting the output of the ignition signal SA in Step S202 reaches this pulse width. As a result, Step S203 is repeated until it is determined that the charge amount of the ignition coil 300a reaches the target charge amount (Step S203: NO), and when it is determined that the charge amount reaches the target charge amount (Step S203: YES), the process proceeds to Step S204.

In Step S204, the ignition control unit 83 turns off the pulse of the ignition signal SA and ends the charging of the ignition coil 300a. In response to an output stop of the ignition signal SA, the electric energy accumulated in the ignition coil 300a is supplied from the secondary coil 320 to the spark plug 200. When the output of the ignition signal SA is stopped in Step S204, the energization control process for the ignition coil 300a illustrated in the flowchart of FIG. 8 ends.

Next, the flowchart of FIG. 9 will be described. In the following description, an ignition coil, which is a control target in the flowchart, among the ignition coils 300b to 300c, is referred to as a "control target coil".

As illustrated in FIG. 9, in Step S301, the ignition control unit 83 determines whether or not to start charging the control target coil, based on the charging start timing set in Step S104 of FIG. 7. Step S301 is repeated until it is determined to start the charging (Step S301: NO), and when it is determined to start the charging (Step S301: YES), the process proceeds to Step S302.

In Step S302, the ignition control unit 83 turns on the pulse of the ignition signal SA to start charging the control target coil. According to the output of this ignition signal SA, electric energy is accumulated in the primary coil 310 of the control target coil.

In Step S303, the ignition control unit 83 uses the charge amount detection unit 350 to detect a charge amount of the electric energy currently accumulated in the control target coil. Here, the charge amount of the control target coil can be detected by obtaining an integrated value of voltage and current of the primary coil 310 in the control target coil detected by the charge amount detection unit 350.

In Step S304, the ignition control unit 83 determines whether or not the ignition due to the discharge of the spark plug 200 using the electric energy of the control target coil exceeds a predetermined ignition timing range. For example, it is determined whether or not the charge amount of the control target coil detected in Step S303 is equal to or more than a predetermined value, and when the charge amount is equal to or more than the predetermined value, the control target coil is magnetically saturated and cannot be charged any more. Accordingly, it is determined that the ignition timing range has passed (Step S304: YES), and the process proceeds to Step S310. The predetermined value of the charge amount used for this determination is larger than the target charge amount of the control target coil set in Step S103 of FIG. 7. Meanwhile, when the charge amount of the control target coil is less than the predetermined value, it is determined that the ignition timing range has not yet passed (Step S304: NO), and the process proceeds to Step S305.

In Step S304, it may be determined by a method other than the above method whether or not the ignition timing range has passed. For example, it may be determined whether or not the ignition timing range has been exceeded based on the elapsed time from the start of the first discharge using the electric energy of the ignition coil 300a, the engine speed, the opening of the throttle 113, the fuel injection amount, or the like.

In Step S305, the ignition control unit 83 estimates the supply-able voltage of the electric energy currently supplied to the spark plug 200. At this time, for example, the ignition control unit 83 obtains the amount of electric energy which has been released by the discharge of the spark plug 200 by obtaining the integrated value of the discharge voltage and the current detected by the discharge amount detection unit 360. Then, by subtracting the amount of electric energy due to this discharge from the amount of electric energy which has been supplied to the spark plug 200 by all the ignition coils 300, the amount of electric energy in the ignition coil 300 which can be currently supplied is estimated, and the supply-able voltage can be estimated based on this estimated value. The amount of electric energy which has been supplied to the spark plug 200 by all the ignition coils 300 is obtained as a total value of the charge amounts finally accumulated in the respective ignition coils, which have released the electric energy, among the ignition coils 300a to 300d constituting the ignition coil 300.

For example, in Step S204 of FIG. 8, when the pulse of the ignition signal SA with respect to the ignition coil 300a has been switched from ON to OFF and the ignition coil 300b is being charged, the amount of electric energy which has been supplied to the spark plug 200 is obtained by obtaining the charge amount finally accumulated in the ignition coil 300a. Specifically, in Step S204 of FIG. 8, the charge amount immediately before the pulse of the ignition signal SA with respect to the ignition coil 300a is switched from ON to OFF, that is, the amount of electric energy which has been supplied to the spark plug 200 is obtained from the target charge amount of the ignition coil 300a set in Step S103 of FIG. 7. Then, a current supply-able voltage is estimated by estimating the voltage which can be supplied from the ignition coil 300a to the spark plug 200 using the amount of electric energy.

Further, for example, in Step S309 described later, when the pulse of the ignition signal SA with respect to the ignition coil 300b has been switched from ON to OFF and the ignition coil 300c is being charged, the amount of electric energy which has been supplied to the spark plug 200 is obtained by summing the charge amounts which are finally accumulated in the ignition coils 300a and 300b. At this time, the charge amount finally accumulated in the ignition coil 300b is obtained from the charge amount finally detected in Step S303. Then, by using this amount of electric energy, the current supply-able voltage is estimated by estimating the voltage which can be supplied from the ignition coil 300a and the ignition coil 300b to the spark plug 200.

Similarly, in Step S309 to be described later, when the pulse of the ignition signal SA to the ignition coil 300c has been switched from ON to OFF and the ignition coil 300d is being charged, the amount of electric energy which has been supplied to the spark plug 200 is obtained by summing the charge amounts which are finally accumulated in the ignition coils 300a, 300b, and 300c. Then, by using this amount of electric energy, the current supply-able voltage is estimated by estimating the voltage which can be supplied from the ignition coil 300a, the ignition coil 300b, and the ignition coil 300c to the spark plug 200.

When the ignition coil 300 is configured of four or more coils, the same process as above may be repeated for the number of coils. In Step S305, the voltage which can be supplied from the ignition coil 300 to the spark plug 200 is thus estimated.

In Step S306, the ignition control unit 83 detects the required voltage necessary to maintain the discharge of the spark plug 200. At this time, as described in FIG. 6(a), if the discharge of the spark plug 200 is continued, the ignition control unit 83 can detect the required voltage by detecting the inter-electrode voltage of the spark plug 200 by the discharge amount detection unit 360. The required voltage detected here is changed according to the state of the internal combustion engine 100. Specifically, the required voltage is changed according to the rotation speed of the internal combustion engine 100 represented by the engine speed information S5 from the rotation speed information generation unit 86, the opening of the throttle valve 113 detected by the throttle opening sensor 113a, the fuel injection amount from the fuel injection valve 134 calculated by the fuel injection control unit 82, or the like. Further, when a tumble generation valve is attached to the internal combustion engine 100, the required voltage is also changed depending on an opening of the tumble generation valve.

In Step S307, the ignition control unit 83 calculates a difference d between the supply-able voltage estimated in Step S305 and the required voltage detected in Step S306.

In Step S308, the ignition control unit 83 determines whether or not the difference d between the supply-able voltage calculated in Step S307 and the required voltage is equal to or less than a predetermined threshold value set in advance. When the difference d is larger than the threshold value (Step S308: NO), the process returns to Step S303 and the energization control of the control target coil is continued.

Meanwhile, when the difference d is equal to or less than the threshold value (Step S308: YES), the process proceeds to Step S309.

In Step S309, the ignition control unit 83 turns off the pulse of the ignition signal SA for an ignition coil having the highest priority among the control target coils which have not yet released the electric energy, and ends the charging of the ignition coil. When the output of the ignition signal SA is stopped, the electric energy accumulated in the ignition coils 300b to 300d is sequentially supplied to the spark plug 200 from the secondary coil 320.

Specifically, after the electric energy of the ignition coil 300a is supplied to the spark plug 200, when the difference d between the voltage which can be supplied from the ignition coil 300a to the spark plug 200 and the required voltage is equal to or less than the predetermined threshold value, in Step S309, the ignition control unit 83 controls energization of the ignition coil 300b so that the electric energy of the ignition coil 300b is supplied to the spark plug 200. In addition, after the electric energy of the ignition coil 300b is supplied to the spark plug 200, when the difference d between the voltage which can be supplied from the ignition coil 300*a* and the ignition coil 300*b* to the spark plug 200 and the required voltage is equal to or less than the predetermined threshold value, in Step S309, the ignition control unit 83 controls energization of the ignition coil 300*c* so that the electric energy of the ignition coil 300*c* is supplied to the spark plug 200. Furthermore, after the electric energy of the ignition coil 300*c* is supplied to the spark plug 200, when the difference d between the voltage which can be supplied from the ignition coil 300*a*, the ignition coil 300*b*, and the ignition coil 300*c* to the spark plug 200 and the required voltage is equal to or less than the predetermined threshold value, in Step S309, the ignition control unit 83 controls energization of the ignition coil 300*d* so that the electric energy of the ignition coil 300*d* is supplied to the spark plug 200. Here, when the ignition coil 300 is configured of four or more coils, the same process as above may be repeated for the number of coils.

Before the electric energy is supplied from the control target coil to the spark plug 200 in Step S309, when the discharge interruption time is detected in Step S107 of FIG. 7, and then the discharge of the spark plug 200 is restarted using the ignition coil 300*a*, as described with reference to FIG. 5(*a*), the required voltage detected in Step S306 is smaller than that before the discharge interruption. Therefore, in this case, a period until the difference d between the supply-able voltage and the required voltage is determined to be equal to or less than the threshold value is extended in Step S308, and as a result, a timing at which the electric energy of the control target coil is supplied to the spark plug 200 will be delayed. Accordingly, when the discharge is interrupted, it is possible to supply the electric energy of the ignition coils 300*a* to 300*d* to the spark plug 200 after waiting for the discharge path to be long again after the restart of the discharge. Therefore, it is possible to suppress excessive supply of the electric energy after the restart of the discharge.

Further, when the discharge is interrupted, the threshold value used in the determination of Step S308 is corrected in Step S102 when the flowchart of FIG. 7 is subsequently executed. At this time, by correcting the threshold value to be larger than before, when the spark plug 200 is subsequently discharged using the electric energy of the ignition coil 300*a*, before the discharge interruption time detected in Step S107, the electric energy of the ignition coils 300*b* to 300*d* is supplied to the spark plug 200 to continue the discharge of the spark plug 200, and the energization of the ignition coils 300*b* to 300*d* can be controlled so that the discharge is not interrupted. In Step S102, for example, the threshold value can be corrected based on the discharge interruption time detected in Step S107 or the magnitude of the required voltage detected by the discharge amount detection unit 360 in Step S306 immediately before the discharge is interrupted.

When the process proceeds from Step S304 to Step S310, the ignition control unit 83 stops the charging of the control target coil in Step S310. For example, by supplying the electric energy from the control target coil to the spark plug 200 and discharging the spark plug 200 at a time when there is no effect on a combustion cycle, the electric energy accumulated in the control target coil is discharged to stop the charging of the control target coil. Alternatively, by slowly decreasing the voltage of the ignition signal SA to be output to the control target coil and gradually changing the ignition signal SA from ON to OFF, it is possible to release the electric energy accumulated in the control target coil to stop the charging of the control target coil without discharging the spark plug 200. Accordingly, the discharge interruption time is detected in Step S107 of FIG. 7, and thereafter, when the ignition timing range of the control target coil is exceeded by restarting the discharge of the spark plug 200 using the ignition coil 300*a*, it is possible to suppress wasteful discharge of the spark plug 200 by preventing the electric energy of the control target coil from being supplied to the spark plug 200.

After executing the process of Step S309 or Step S310, the ignition control unit 83 ends the energization control process illustrated in the flowchart of FIG. 9 for the ignition coil.

According to the embodiment described above, the following operational effects are exhibited.

(1) The control device 1 for an internal combustion engine includes the ignition control unit 83 which controls the energization of the ignition coil 300*a* and the ignition coil 300*b* which each provide the electric energy to the spark plug 200 which discharges in the cylinder 150 of the internal combustion engine 100 to ignite the fuel; and the discharge amount detection unit 360 which detects the inter-electrode voltage of the spark plug 200. After the ignition control unit 83 discharges the spark plug 200 using the electric energy of the ignition coil 300*a* (Step S204), the ignition control unit estimates the voltage which is supply-able from the ignition coil 300*a* to the spark plug 200 (Step S305), and controls the energization of the ignition coil 300*b* so as to supply the electric energy of the ignition coil 300*b* to the spark plug 200 (Step S309) when the difference d between the estimated supply-able voltage and the required voltage for maintaining the discharge of the spark plug 200 based on the voltage detected by the discharge amount detection unit 360 is equal to or less than the predetermined threshold value (Step S308: YES). Accordingly, it is possible to improve ignitability of the fuel by the spark plug 200 while suppressing an increase in the number of ignition coils.

(2) The discharge amount detection unit 360 further detects the current flowing between the electrodes of the spark plug 200. After the ignition control unit 83 discharges the spark plug 200 using the electric energy of the ignition coil 300*a*, the ignition control unit 83 detects a discharge interruption time when the discharge of the spark plug 200 is interrupted, based on the voltage or the current detected by the discharge amount detection unit 306 (Steps S106 and S107).

Accordingly, it is possible to appropriately detect the discharge interruption time when the discharge of the spark plug 200 is interrupted.

(3) When the ignition control unit 83 discharges the spark plug 200 using the electric energy of the ignition coil 300*a* after detecting the discharge interruption time, the ignition control unit 83 controls the energization of the ignition coil 300*b* so as to supply the electric energy of the ignition coil 300*b* to the spark plug 200 before the discharge interruption time. Specifically, when the ignition control unit 83 detects the discharge interruption time (Step S101: YES), the ignition control unit 83 corrects the threshold value based on at least one of the discharge interruption time and the voltage detected by the discharge amount detection unit 360 (Step S102). Accordingly, when the discharge of the spark plug 200 is interrupted, it is possible to suppress occurrence of the discharge interruption from the next time so as to continue the discharge, and improve the ignitability.

(4) When the ignition control unit 83 detects the discharge interruption time, the ignition control unit 83 delays a timing at which the electric energy of the ignition coil 300*b* is supplied to the spark plug 200 (Steps S306 to S309), or controls the energization of the ignition coil 300b so that the electric energy of the ignition coil 300b is not supplied to the spark plug 200 (Step S310). Accordingly, when the discharge of the spark plug 200 is restarted after the discharge interruption, it is possible to suppress excessive supply of the electric energy and suppress wasteful discharge.

(5) The required voltage is changed according to at least one of the rotation speed of the internal combustion engine 100, the opening of the throttle valve 113 attached to the internal combustion engine 100, the opening of the tumble generation valve attached to the internal combustion engine 100, and the injection amount of the fuel from the fuel injection valve 134 attached to the internal combustion engine 100. Accordingly, the supply timing of the electric energy from the ignition coil 300b to the spark plug 200 can be determined using the suitable required voltage according to the state of the air-fuel mixture in the internal combustion engine 100.

(6) Each of the ignition coil 300a and the ignition coil 300b has the primary coil 310 which is energized by the ignition control unit 83 to accumulate the electric energy, and the secondary coil 320 which supplies the electric energy accumulated in the primary coil 310 to the spark plug 200. The ignition control unit 83 sets the target charge amounts of the ignition coil 300a and the ignition coil 300b (Step S103), and adjusts the energization time of the primary coil 310 based on the set target charge amounts (Step S105). Accordingly, it is possible to appropriately adjust the energization time of each ignition coil.

(7) The spark plug 200 is further connected to the ignition coil 300c.

After the ignition control unit 83 supplies the electric energy of the ignition coil 300b to the spark plug 200, the ignition control unit 83 estimates a voltage which is supply-able from the ignition coil 300a and the ignition coil 300b to the spark plug 200 (Step S305), and controls the energization of the ignition coil 300c so as to supply the electric energy of the ignition coil 300c to the spark plug 200 (Step S309) when the difference d between the estimated supply-able voltage and the required voltage is equal to or less than the threshold value (Step S308: YES).

Accordingly, it is possible to further continue the discharge.

(8) The spark plug 200 is further connected to the ignition coil 300d.

After the ignition control unit 83 supplies the electric energy of the ignition coil 300c to the spark plug 200, the ignition control unit 83 estimates the voltage which is supply-able from the ignition coil 300a, the ignition coil 300b, and the ignition coil 300c to the spark plug 200 (Step S305), and controls the energization of the ignition coil 300d so as to supply the electric energy of the ignition coil 300d to the spark plug 200 (Step S309) when the difference d between the estimated supply-able voltage and the required voltage is equal to or less than the threshold value (Step S308: YES). Accordingly, it is possible to further continue the discharge.

In the embodiment described above, each functional configuration of the control device 1 described in FIG. 3 may be realized by software executed by the MPG 50 as described above, or may be realized by hardware such as a Field-Programmable Gate Array (FPGA). In addition, these may be mixed and used.

The embodiment and various modification examples described above are merely examples, and the present invention is not limited to these contents unless the characteristics of the invention are impaired. Moreover, although various embodiments and modification examples are described above, the present invention is not limited to these contents. Other modes considered within a scope of a technical idea of the present invention are also included in the scope of the present invention.

REFERENCE SIGNS LIST 1 control device
10 analog input unit
20 digital input unit
30 A/D converter
40 RAM
50 MPU
60 ROM
70 I/O port
80 output circuit
81 overall control unit
82 fuel injection control unit
83 ignition control unit
84 cylinder determination unit
85 angle information generation unit
86 rotation speed information generation unit
87 intake amount measurement unit
88 load information generation unit
89 water temperature measurement unit
100 internal combustion engine
110 air cleaner
111 intake pipe
112 intake manifold
113 throttle valve
113a throttle opening sensor
114 flow rate sensor
115 intake air temperature sensor
120 ring gear
121 crank angle sensor
122 water temperature sensor
123 crankshaft
125 accelerator pedal
126 accelerator position sensor
130 fuel tank
131 fuel pump
132 pressure regulator
133 fuel pipe
134 fuel injection valve
140 combustion pressure sensor
150 cylinder
151 intake valve
152 exhaust valve
160 exhaust manifold
161 three-way catalyst
162 upstream-side air-fuel ratio sensor
163 downstream-side air-fuel ratio sensor
170 piston
200 spark plug
210 center electrode
220 outer electrode
230 insulator
300,300a-300d ignition coil
310 primary coil
320 secondary coil
330 DC power supply
340 igniter
350 charge amount detection unit
360 discharge amount detection unit
400a electric circuit

The invention claimed is:

1. A control device for an internal combustion engine, comprising:
    an ignition controller configured to control energization of a first ignition coil and a second ignition coil which each provide electric energy to a spark plug which discharges in a cylinder of an internal combustion engine to ignite a fuel; and
    a discharge amount detector configured to detect a voltage between electrodes of the spark plug,
    wherein after the ignition controller discharges the spark plug using the electric energy of the first ignition coil, the ignition controller estimates a voltage which is supply-able from the first ignition coil to the spark plug, and controls energization of the second ignition coil so as to supply the electric energy of the second ignition coil to the spark plug when a difference between the estimated supply-able voltage and a required voltage for maintaining discharge of the spark plug based on the voltage detected by the discharge amount detector is equal to or less than a predetermined threshold value,
    wherein the required voltage is changed according to all of a rotation speed of the internal combustion engine, an opening of a throttle valve attached to the internal combustion engine, an opening of a tumble generation valve attached to the internal combustion engine, and an injection amount of the fuel from a fuel injection valve attached to the internal combustion engine,
    wherein the spark plug is further connected to a third ignition coil, and after the ignition controller supplies the electric energy of the second ignition coil to the spark plug, the ignition controller estimates a voltage which is supply-able from the first ignition coil and the second ignition coil to the spark plug, and controls energization of the third ignition coil so as to supply electric energy of the third ignition coil to the spark plug when a difference between the estimated supply-able voltage and the required voltage is equal to or less than the threshold value, and
    wherein the spark plug is further connected to a fourth ignition coil, and after the ignition controller supplies the electric energy of the third ignition coil to the spark plug, the ignition controller estimates a voltage which is supply-able from the first ignition coil, the second ignition coil, and the third ignition coil to the spark plug, and controls energization of the fourth ignition coil so as to supply electric energy of the fourth ignition coil to the spark plug when a difference between the estimated supply-able voltage and the required voltage is equal to or less than the threshold value.

2. The control device for an internal combustion engine according to claim 1,
    wherein the discharge amount detector is further configured to detect a current flowing between the electrodes of the spark plug,
    after the ignition controller discharges the spark plug using the electric energy of the first ignition coil, the ignition controller detects a discharge interruption time when the discharge of the spark plug is interrupted, based on the voltage or the current detected by the discharge amount detector.

3. The control device for an internal combustion engine according to claim 1,
    wherein each of the first ignition coil and the second ignition coil has a primary coil arranged to be energized by the ignition controller to accumulate the electric energy, and a secondary coil configured to supply the electric energy accumulated in the primary coil to the spark plug, and
    the ignition controller is configured to set target charge amounts of the first ignition coil and the second ignition coil, and adjust an energization time of the primary coil based on the set target charge amounts.

4. The control device for an internal combustion engine according to claim 2,
    wherein when the ignition controller discharges the spark plug using the electric energy of the first ignition coil after detecting the discharge interruption time, the ignition controller controls the energization of the second ignition coil so as to supply the electric energy of the second ignition coil to the spark plug before the discharge interruption time.

5. The control device for an internal combustion engine according to claim 2,
    wherein when the ignition controller detects the discharge interruption time, the ignition controller delays a timing at which the electric energy of the second ignition coil is supplied to the spark plug, or controls the energization of the second ignition coil so that the electric energy of the second ignition coil is not supplied to the spark plug.

6. The control device for an internal combustion engine according to claim 4,
    wherein when the ignition controller detects the discharge interruption time, the ignition controller corrects the threshold value based on at least one of the discharge interruption time and the voltage detected by the discharge amount detector.

* * * * *